United States Patent
Luo et al.

(10) Patent No.: US 7,418,706 B1
(45) Date of Patent: Aug. 26, 2008

(54) RESCHEDULING TABLE SCAN TRANSACTIONS

(75) Inventors: Gang Luo, Madison, WI (US); Jeffrey F. Naughton, Madison, WI (US); Curt J. Ellmann, Madison, WI (US); Michael W. Watzke, Madison, WI (US)

(73) Assignee: Teradota US, Inc., Miamisburg, OH (US)

(*) Notice: Subject to any disclaimer, the term of this patent is extended or adjusted under 35 U.S.C. 154(b) by 936 days.

(21) Appl. No.: 10/431,751

(22) Filed: May 8, 2003

(51) Int. Cl.
*G06F 9/46* (2006.01)
*G06F 12/00* (2006.01)

(52) U.S. Cl. .................. 718/103; 718/100; 707/200

(58) Field of Classification Search .............. 718/102, 718/104, 103, 100; 707/8, 200; 711/158
See application file for complete search history.

(56) References Cited

U.S. PATENT DOCUMENTS

| | | | | |
|---|---|---|---|---|
| 5,448,732 A | * | 9/1995 | Matsumoto | 718/104 |
| 5,717,918 A | * | 2/1998 | Takayama et al. | 707/8 |
| 6,614,709 B2 | * | 9/2003 | Spiegel et al. | 365/230.01 |
| 7,149,857 B2 | * | 12/2006 | Jeddeloh | 711/158 |
| 2002/0038313 A1 | * | 3/2002 | Klein et al. | 707/200 |
| 2002/0124083 A1 | * | 9/2002 | Jeyaraman et al. | 709/225 |

OTHER PUBLICATIONS

Rick Grehan, "How to Climb a B-tree: B-tree, a popular tree-indexing structure, is perfect for db4o database system, and can save you a lot of disk access time," printed from http://www.fawcette.com, 2 pages (dated as early as Jan. 8, 2003).
Kevin Jones, "TPFDF B+Tree Indexing Support," printed from http://www-3.ibm.com, pp. 1-3 (dated as early as Jan. 8, 2003).
SAP Library-User Manual: SAP DB, "B*Tree," printed from http://pipin.tmd.ns.ac.yu, pp. 1-2 (dated as early as Jan. 8, 2003).
ACM, "Locking Protocols for Materialized Aggregate Join Views: Paper ID: 107," SIGMOD, pp. 1-11 (2003).

* cited by examiner

*Primary Examiner*—Meng-Ai An
*Assistant Examiner*—Camquy Troung
(74) *Attorney, Agent, or Firm*—Trop, Pruner & Hu, P.C.

(57) ABSTRACT

A database system includes a rescheduler that performs rescheduling of transactions in a scheduling queue based on one or more criteria. One criterion is whether a first transaction in the queue can be performed as a synchronized scan of a table with a second transaction that is currently executing. This enables the first and second transactions to share a segment of a buffer storage pool.

26 Claims, 4 Drawing Sheets

RESCHEDULING TABLE SCAN TRANSACTIONS

BACKGROUND

A relational database is a collection of logically related data that includes tables (or relations) made up of rows (or tuples) and columns (or attributes). Each row represents an occurrence of an entity defined by a table, with an entity being a person, place, or thing about which the table contains information. To extract data from, or to update, a relational table, queries according to a standard database query language (e.g., Structured Query Language or SQL) are used.

Certain queries call for full-table scans to be performed, which are expensive in terms of resources consumed, especially if the scans are of large tables. A full-table scan refers to reading in sequence all rows of a table. Some database systems, such as those in which a data warehouse is implemented, store very large tables (with millions or even billions of rows). As ad hoc querying of data warehouses is becoming more common, concurrent full-table scans in a database system frequently occur. A large number of full table scans will consume a large portion of the disk I/O capacity in the database system and significantly decrease the amount of disk I/O capacity available to other transactions. To improve performance of concurrent full-table scans, a synchronized scan technique is used, in which two or more transactions that are scanning the same table are grouped together so that disk I/O activities can be shared between them. This reduces the cumulative number of I/O accesses required by the table scans while additionally saving CPU (central processing unit) cycles that would otherwise have been required to process the extra I/O accesses.

When multiple transactions are received in a database system, they are temporarily stored in a scheduling queue. As system resources become available, the transactions in the queue are executed. One such system resource is a buffer pool, which is a cache maintained in system memory for temporarily storing data retrieved from a table. The buffer pool is usually divided into multiple buffer segments, with one buffer pool segment allocated per transaction. As a database system becomes more fully loaded, the buffer pool becomes filled such that no new transactions are admitted for execution. With a conventional buffer management algorithm, after all buffer pool segments (or a large percentage of buffer pool segments) in the buffer pool are committed, no new transactions are allowed to enter the database system for execution. Conventional buffer management algorithms do not take advantage of the synchronized scan technique in admitting new transactions when a buffer pool becomes filled. For example, after all the buffer pool segments are used up, even if some transaction $T_1$ is currently doing a table scan on relation R, a new transaction $T_2$ scanning the same relation R is not allowed to enter the system to join transaction $T_1$.

SUMMARY

In general, a transaction rescheduling mechanism is provided that takes into account whether a synchronized scan can be performed to share a buffer pool resource in admitting a new transaction. For example, a method of scheduling transactions in a database system includes receiving transactions in a queue and determining whether any of the transactions in the queue are able to perform a synchronized scan of a table with a first transaction that is executing. In response to determining that at least one of the transactions in the queue is able to perform the synchronized scan with the first transaction, the transactions in the queue are rescheduled to enable execution of the at least one transaction ahead of other transactions in the queue.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
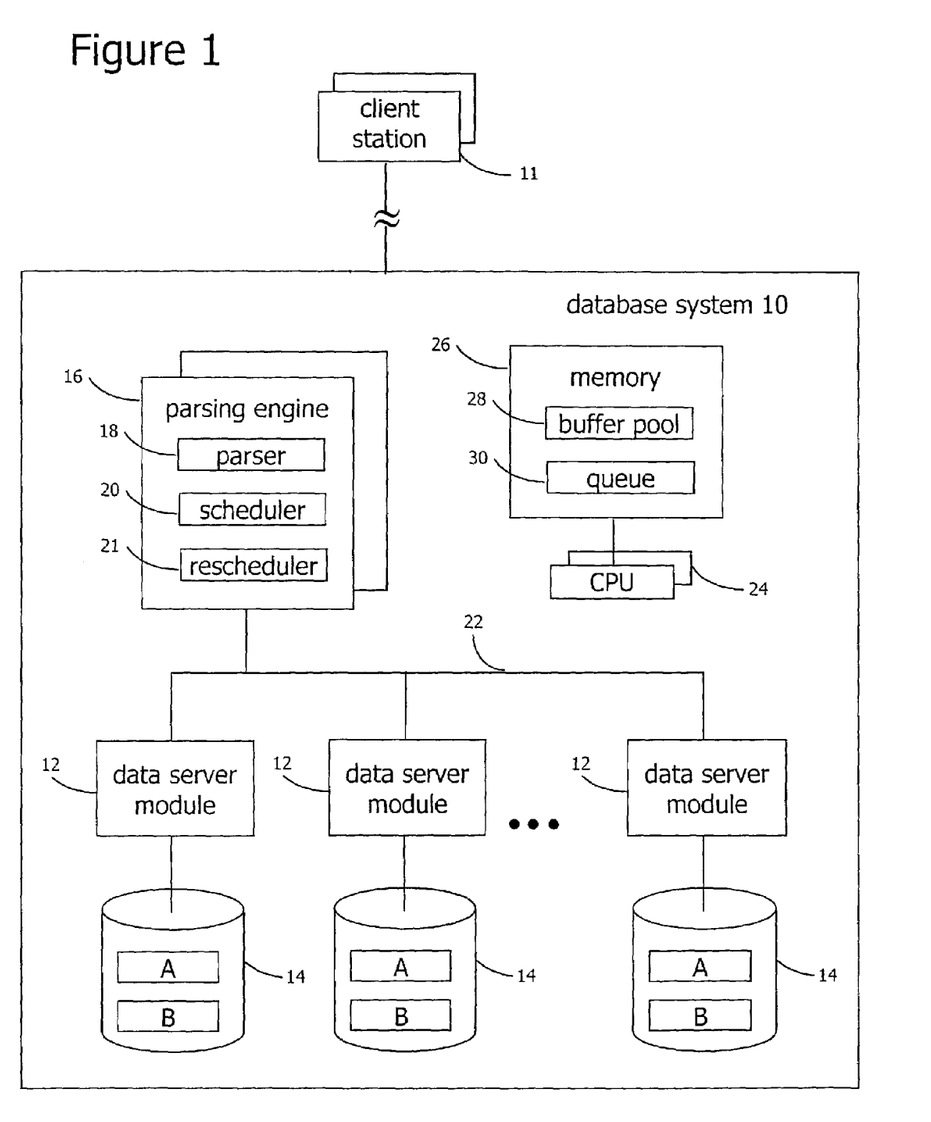
FIG. 1 is a block diagram of an example arrangement of a database system and a client station(s) coupled to the database system

FIG. 1 shows an example arrangement of a database system 10 that stores base relations (e.g., A, B). The database system 10 is an example of a parallel database system having a plurality of data server modules 12. Each data server module 12 is responsible for managing the access to or modification of data stored in a respective storage module 14. The multiple data server modules 12 can perform operations in parallel such that concurrent access of data can be performed. Examples of responsibilities of each data server module (also referred to as an "access module") include locking databases, tables, or portions of tables; creating, modifying, or deleting definitions of tables; inserting, deleting, or modifying rows within tables; and retrieving information from definitions and tables. In one example implementation, the data server modules 12 are based on access modules processors (AMPs) in TERADATA® database systems from NCR Corporation.

In one implementation, a requesting client, such as software application in the database system 10 or a client station 11 coupled over a data network, sends requests to the database system 10. Received requests are processed by one or more parsing engines 16. The requests are in the form of queries, such as queries according to a standard database query language (e.g., Structured Query Language or SQL, as provided by the American National Standards Institute or ANSI). In other embodiments, other types of database query languages are used.

Each parsing engine 16 includes a parser 18 and a scheduler 20. The parser 18 checks a received request for proper syntax and semantically evaluates the request. The parser 18 also includes an optimizer that develops an execution plan for the received requests. The execution plan includes a sequence of executable steps that are communicated by the scheduler 20 in the parsing engine 16 to one or more of the data server modules 12 for execution. The parsing engine 16 further includes a rescheduler 21. The rescheduler 21 and scheduler 20 are shown in FIG. 1 as separate components in the parsing engine 16. Alternatively, the scheduler and rescheduler can be integrated into one module. Also, as yet another alternative, the rescheduler is provided outside the parsing engine 16.

A query, or sequence of queries, are processed in the database system 10 in a given transaction. There often are multiple transactions actively running at the same time in the database system 10. In addition, other transactions may be waiting in a scheduling queue 30 to be scheduled for execution by the database system 10.

The scheduling queue 30 is stored in system memory 26. Alternatively, the scheduling queue 30 can be stored in another storage in the database system 10. The system memory 26 is coupled to one or more central processing units (CPU) 24, on which various software modules, such as the parsing engine 16 and data server modules 12, are executable.

The rescheduler 21 is capable of reordering or rescheduling the transactions in the scheduling queue 30 based on various factors. Reordering or rescheduling waiting or pending transactions in the scheduling queue 30 refers to changing an order in which the pending transactions are to be executed. For example, one arrangement of the queue 30 is a first-in-first-out (FIFO) queue, such that transactions are executed in the order they are received. Reordering or rescheduling the transactions refers to changing the initial order of the transactions to a different order based on predefined factors.

One of these factors is whether a waiting transaction in the scheduling queue 30 is a table scan that is capable of being executed in a synchronized scan with another transaction that is actively running. If so, the waiting transaction in the queue 30 is eligible for rescheduling by the rescheduler 21 such that the selected transaction is moved in front of other transactions that were ahead of the selected transaction in the queue. A table scan refers to a scan of rows of a table by a transaction in a given sequence.

By taking into account whether a particular table scan transaction can take advantage of using synchronized scan in determining whether any given pending transaction is to be rescheduled, database system performance can be improved since the multiple transactions involved in the synchronized scan are able to share resources, in this case a buffer pool 28 stored in the system memory 26.

A buffer pool is a temporary storage area (or cache) in the system memory 26 allocated to store information associated with transactions that are actively running in the database system 10. The buffer pool 28 is divided into multiple segments, with each segment allocated to one transaction. When the buffer pool 28 is filled up (or close to being filled up), then further transactions typically will not be admitted for execution in the database system 10. However, there is an exception for table transactions that can be run concurrently as synchronized scans with actively running transactions. If two transactions are scanning the same table, then the two transactions can be executed together if they are synchronized with each other. For example, assume a first transaction T1 first starts to scan pages of table A. A "page" refers to a predetermined block of storage that stores contents of database structures, such as tables. Depending on system configuration, a page typically has sufficient space to store multiple rows of a table.

In this example, assume further that by the time transaction T1 has reached the tenth page of table A, a second transaction T2 is started that also scans table A. Synchronized scanning refers to synchronizing the second transaction T2 to the first transaction T1 such that instead of starting at the first page, transaction T2 starts at the tenth page to synchronize with the first transaction T1 which has already reached the tenth page. In this manner, both transactions T1 and T2 are synchronized in their scanning of table A, such that the two transactions T1 and T2 can share the same segment of the buffer pool 28. Thus, even if the buffer pool 28 is filled, the scheduler 20 and rescheduler 21 according to some embodiments of the invention are able to admit a waiting transaction in the queue 30 if that transaction can perform a synchronized scan with another transaction that is already currently running (and thus already allocated a segment of the buffer pool 28). The database system throughput improvement is achieved by sharing the buffer pool resource.

In accordance with some embodiments of the invention, the transaction rescheduling or reordering framework employed is a "sliding window transaction rescheduling" framework that utilizes both the current system status and information about the interaction between queued and running transactions. In the database system 10, generally, at any time there are $M_1$ transactions waiting in the queue 30 to be admitted to the system for execution, while another $M_2$ transactions forming an active set $S_r$, are currently running in the database system. In one implementation, a sliding window of size N keeps track of the first N transactions in the transaction admission queue 30. The first N transactions are candidates for rescheduling; that is, the rescheduler 21 is able to reorder the first N transactions waiting in the queue so that the expected throughput of the reordered transactions exceeds that of the original transaction sequence.

In its reordering decisions, the rescheduler 21 exploits properties it deduces about the blocked transactions in the queue 30 and the properties the rescheduler 21 knows about the active transactions in $S_r$. The improvement in overall system throughput is a function of the number of factors considered for reordering transactions, the size of the sliding window, and the quality of the original transaction sequence. The more factors considered and the larger the sliding window, the greater the throughput performance of the reordered transaction sequence. However, the time spent on reordering cannot be unlimited, as the rescheduler 21 has to ensure that the reordering overhead is smaller than the benefit gained in throughput. Reordering transactions requires processing by the CPU 24. However, the increasing disparity between CPU and disk performance renders trading CPU cycles for disk I/O accesses more attractive as a way of improving database system performance.

As noted above, one of the factors considered by the rescheduler 21 in reordering transactions in the queue 30 is improved buffer pool performance by exploiting synchronized scans. Another factor that is considered is analyzing for lock conflicts, or the lack thereof, in determining how transactions are reordered or rescheduled. One implementation of such rescheduling based on lock conflicts is described in U.S. Ser. No. 10/121,190, entitled "Rescheduling Transactions In A Database System," filed Apr. 12, 2002, now U.S. Pat. No. 6,990,503, and hereby incorporated by reference.

The transaction rescheduling mechanism based on lock conflicts is used to reduce the number of occurrences of lock conflicts and/or deadlocks, particularly in the presence of materialized views. A view is a derived relation formed by performing a function (e.g. a join) of one or more base relations.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of the table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If materialized views are also stored in the database system, a locking mechanism is also provided for the materialized view. In one embodiment, a "Y-lock" locking mechanism is provided for the materialized view. In another embodiment, a "no-lock" locking mechanism is provided for the materialized view. In yet another embodiment, a "name-lock" locking mechanism is provided for the materialized view.

These locking mechanisms for the materialized view are designed to reduce the likelihood of lock conflicts between transactions that operate on a materialized view. Although such locking mechanisms on materialized views decrease the likelihood of lock conflicts due to the presence of materialized views, further reduction of lock conflicts is still desired by using a transaction rescheduling mechanism according to some embodiments. The transaction rescheduling mechanism according to some embodiments reorders pending transactions so that locks conflicts due to the presence of materialized views can be reduced. Additionally, query grouping can also be optionally used to group queries for the purpose of eliminating duplicate locks so that the number of locks placed on base relations and views are reduced. Further details regarding the rescheduling mechanism that takes into account lock conflicts is described in the 10/121,190 application referenced above.

Figure 2:
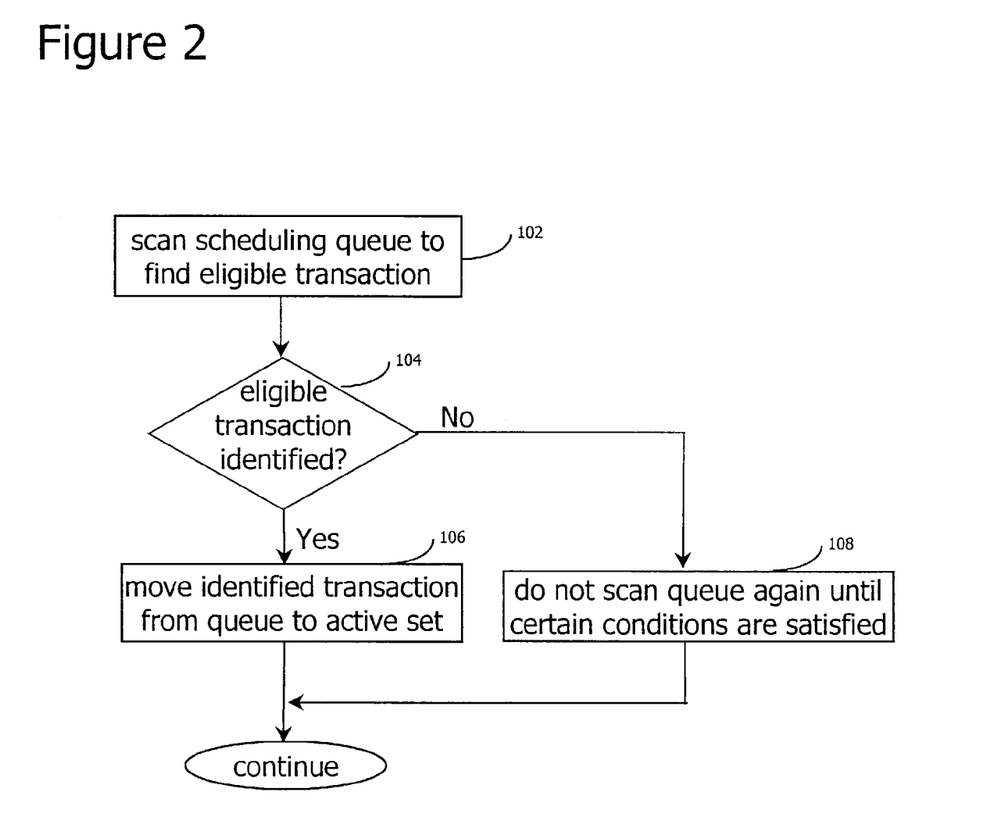
FIG. 2 is a flow diagram of a rescheduling process to reorder transactions in a queue.

In accordance with some embodiments of the invention, the rescheduling process that is based on synchronized scan is shown in FIG. 2. The rescheduler 21 scans (at 102) the scheduling queue 30 sequentially until an eligible transaction T is found or N (a predefined number) transactions have been scanned, which ever occurs first. The use of N is to avoid scanning the queue 30 indefinitely, as previously scanned transactions in the queue 30 may become suitable for execution after conflicting transactions in the active set $S_r$ of transactions are committed or aborted. Conceptually, the first N transactions in the queue 30 form a sliding window. An eligible transaction T is chosen by the rescheduler 21 according to one or more reordering criteria, such as the lock conflict criterion and/or resource pool criterion discussed above. If a transaction meeting the one or more criteria is identified, the identified transaction is moved (at 106) by the rescheduler 21 from the queue 30 to the set $S_r$ of active transactions and executed. Otherwise, the rescheduler 21 does not scan (at 108) the queue 30 again until either some transaction T' leaves the set $S_r$ and possibly makes some transaction in the sliding window become desirable, or the number of elements in the queue is less than N and some new transaction enters the queue 30.

Once a transaction is committed or aborted, the transaction leaves the set $S_r$.

When the rescheduler 21 searches for a desirable transaction, the rescheduler 21 is essentially looking for a transaction that is "compatible" with the running transactions in $S_r$. Implicitly, the rescheduler 21 is dividing transactions into different types and only concurrently executes the transactions that are of "compatible" types. Transactions of the same type ideally do not conflict and can be interleaved. Also, in the transaction rescheduling technique according to some implementations, the rescheduler 21 seeks to preserve serializability, since it is assumed that the strict two-phase locking protocol is used and transaction rescheduling is done outside of the query execution engine.

To further improve performance, the rescheduler 21 does not start scanning the queue 30 from the first element in the operation shown in FIG. 2. The following illustrates why scanning from the first element degrades system performance. Suppose that a first transaction T1 in the queue 30 conflicts with a second transaction T2 in the queue 30. After T1 is moved from the queue 30 to the set $S_r$ for execution, the transaction T2 becomes the first transaction in the queue. As T1 needs some time for execution, it will stay in $S_r$ for some time. During this time period, $T_2$ cannot be moved from the queue 30 to set $S_r$ for execution. However, if the rescheduler 21 always starts scanning the queue 30 from the first element, T2, the operation illustrated in FIG. 2 will be inefficient, as T2 is not a desirable transaction during this time period. To address this issue, the rescheduler 21 keeps the first N elements of the queue 30 as a "round-robin" queue. Each time the rescheduler 12 scans the queue 30, the rescheduler 21 starts the scan with the element next to the element that the rescheduler previously stopped in the round-robin queue. If some transaction is moved from the queue 30 to the set $S_r$, and there are more than N elements in the queue 30, the (N+1)st of the queue 30 will be moved to the end of the round-robin queue.

Figure 3:
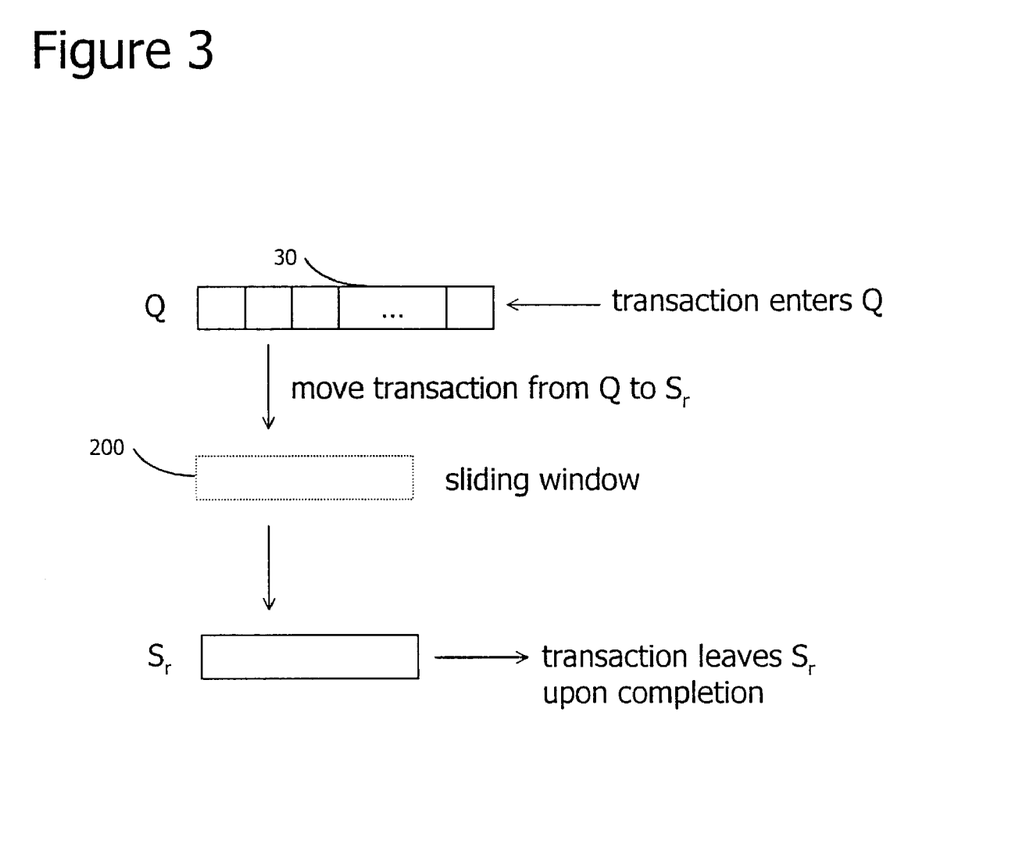
FIG. 3 illustrates an example transaction scheduling operation.

The rescheduling of a transaction is illustrated in FIG. 3, which shows a transaction T entering the queue 30. The dashed box 200 represents the N-wide round-robin queue 200 that moves as the rescheduling proceeds. If the transaction T is in the round-robin queue 200, and the transaction T is identified as being eligible, the transaction T is moved to the active set $S_r$. Once the transaction T completes, it leaves the active set $S_r$.

Figure 4:
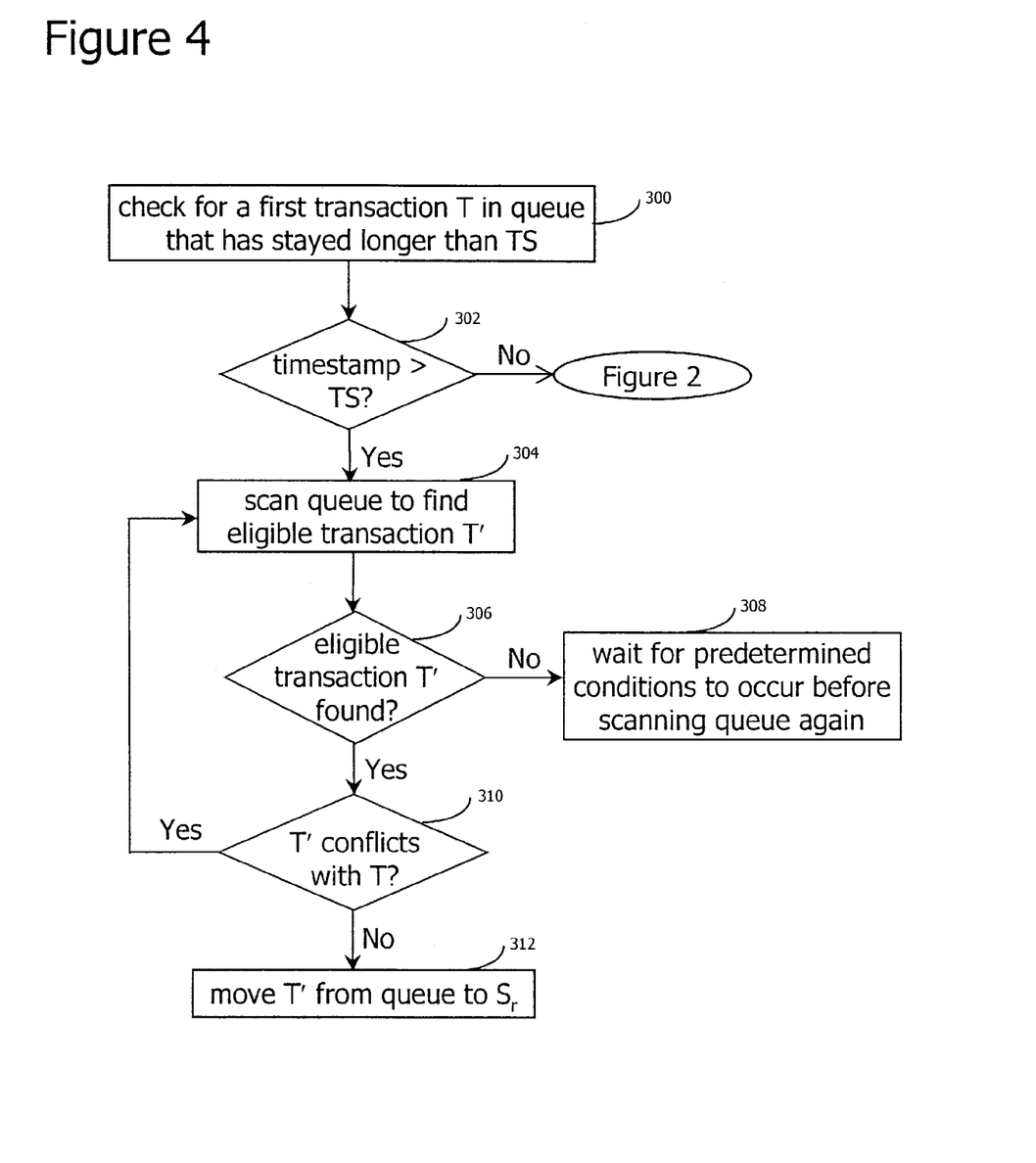
FIG. 4 is a flow diagram of further acts of the rescheduling process to prevent starvation of a waiting transaction in the queue.

As further shown in FIG. 4, to prevent the starving of a transaction, a predefined time period TS is defined. The rescheduler 21 checks (at 300) for a first transaction T in the queue that has stayed in the queue 30 as the first element longer than TS. The first transaction in the queue 30 is associated with a timestamp to indicate how long the first transaction has stayed in the queue as the first element of the queue. If the timestamp of the transaction T does not exceed TS, as determined at 302, then the process of FIG. 2 is performed. However, if the timestamp of the first transaction T exceeds TS, the rescheduler 21 scans (at 304) the queue 30 to find an eligible transaction T'. If an eligible transaction is not found (at 306), the rescheduler 21 waits (at 308) for predetermined conditions to occur before scanning the queue again. If an eligible transaction T' is found (at 306), the rescheduler 21 determines (at 310) if the transaction T' conflicts with the first transaction T. If not, the identified transaction T' is moved (at 312) from the queue 30 to the active set $S_r$. If the rescheduler 21 determines (at 310) that transaction T' conflicts with transaction T, then transaction T' is not desirable and a scan for another eligible transaction is performed (at 304).

If the rescheduling criterion is whether transaction T' can be run as a synchronized scan with an active transaction so that a buffer pool segment can be shared, then T' is considered to conflict with T if T' and T cannot be run together in a synchronized scan procedure. T and T' do not conflict if they can be run in a synchronized scan procedure. As an alternative, if the scheduling criterion is based on whether a lock conflict will occur, then two transactions are considered to conflict if their lock requirements conflict.

The following provides further discussion of how buffer pool analysis can be used as a rescheduling criterion. A transaction T that does a full-table scan on relation R refers to a transaction T that only reads relation R and executes no other operations.

As noted above, synchronized scans (scans of the same relation R by two or more different transactions) are typically implemented in the following manner. Assume that the relation R contains $K_2$ pages in total. When a transaction T1 starts a full-table scan on relation R, certain information regarding this fact is added to a data structure DS, which is stored in system memory 26 (FIG. 1). Also, transaction T1 keeps $K_2$ buffer pages as a cache to hold the most recent $K_2$ pages that transaction T1 just accessed in relation R. The cache holding the $K_2$ pages is one segment of the buffer pool 28. When a second transaction $T_2$ later starts a full-table scan on relation R, the database system first checks the in-memory data structure DS to see whether some transaction is currently scanning relation R or not. Assuming transaction T1 is processing the J-th page of relation R, then transaction T2 starts scanning relation R from the J-th page. In this manner, transactions T1 and T2 are able to share the remaining $K_1$–J+1 I/O accesses of the relation R as the two transactions perform a synchronized scan relation R.

When transaction T2 finishes processing the last page of relation R, it goes back to the beginning of relation R to make up the previously omitted first J–1 pages (other transactions may do synchronized scan with transaction T2 for these J–1 pages).

In some cases, transactions T1 and T2 can start drifting apart if the processing time of the scans performed by T1 and T2 differ substantially from each other. As long as the two scans are separated by less than $K_2$ pages, the $K_2$ buffer pages are used to save the intermediate blocks until the slower scan catches up. However, if the divergence exceeds $K_2$ pages, the two scans are separated and run independently, and no common caching is performed.

Once transaction T2 joins transaction T1 to perform a synchronized scan, transaction T2 does not consume many extra buffer pages (except for a few buffer pages to temporarily restore query results) unless some time later the two scans drift too far apart from each other. Drifting of scans does not occur frequently, since the faster scan is in charge of doing the time-consuming operation of fetching pages from disk into the buffer pool. During this period, the slower scan can catch up, as all the pages it is currently working on is in the buffer pool.

Several different techniques can be employed to use buffer pool analysis (for synchronized scans) as a criterion for rescheduling transactions in the queue 30. According to a first technique, an in-memory hash table HT, stored in system memory 26, keeps track of all the full table scans in the queue 30 (not limited to transactions in the N-wide sliding window). Each element in the hash table HT is of the following format: (relation name, list of transactions in the queue 30 that does table scan on the relation). Each time the rescheduler 21 finds a desirable transaction T in the sliding window of the queue 30, if transaction T performs a full-table scan on relation R, the rescheduler 21 moves some (or all) of the other transactions in the queue 30 that does full-table scan on relation R to the set $S_r$ for execution. In some cases, not all of transactions that perform full table scans on relation R can be moved to the set $S_r$ for execution. For example, the database system 10 may set a limit on a number of threads that can be concurrently run in the database system 10. If this limit is reached, then only a limited number of transactions can be moved to the set $S_r$ for execution.

A second technique is discussed below. When a new transaction T that performs a full-table scan on relation R is received by the queue 30, before it is blocked in queue 30, the rescheduler 21 first checks the data structure DS to see whether some transaction in $S_r$ is currently doing a full table scan on relation R. If so, and if threads are available and the system is not on edge of thrashing due to a large number of lock conflicts, the rescheduler 21 runs transaction T immediately so that it does not get blocked in the queue 30. Note that in this case, transaction T does not have table-level lock conflict (on relational R) with any transaction in $S_r$; otherwise, the transaction in $S_r$ that is performing a full table scan of relation R would also have the conflict and would not have been admitted for execution previously.

Suppose some transaction T' has stayed in the queue 30 longer than the time period TS since it has become the first element in the queue 30. In the two techniques discussed above, the rescheduler 21 ensures that those transactions that are moved to $S_r$ do not conflict with T' on table-level locks. Furthermore, suppose transaction T' is not blocked in the queue 30 due to the reason that it has a table-level lock conflict with some transaction in $S_r$. T' may be blocked because the database system is running out of threads or buffer pages, or is on the edge of thrashing due to a large number of lock conflicts. Multiple scans in the same synchronized scan group may occasionally get separated if their scanning speed differ too much from each other. This may cause synchronized scans to consume extra buffer pages so that the system may run out of buffer pages. If this happens, or if the system is running out of threads or on the edge of thrashing due to a number of lock conflicts, the rescheduler 21 stops using the two techniques above until transaction T' is sent to $S_r$ for execution.

To perform transaction rescheduling in a parallel database system, some knowledge about the global state of the database system is needed. For example, the rescheduler 21 needs to know the types of active transactions (in $S_r$) that are currently running in the database system. The easiest way to do this in a parallel database system is to use a centralized rescheduler to reschedule all transactions. However, such a centralized rescheduler may become a bottleneck. To avoid this issue, the following characteristic of the uni-processor transaction rescheduling algorithm is used. For lock conflict analysis, to reschedule a transaction T, the procedure only needs to have the knowledge of those transactions (in $S_r$) that have a table-level lock conflict with transaction T. For synchronized scan, the rescheduler only needs to know those transactions (in queue 30 and $S_r$) that scan the same relation as transaction T. Thus, all the relations in the parallel database system are partitioned as a collection of disjoint sets (e.g., by partitioning the conflict graph into connected components). At each node of the parallel RDBMS, only those transactions related to a given set of relations are rescheduled. That is, transactions related to different sets of relations are rescheduled at different nodes of the parallel database.

There is a second issue. In an operational data warehouse, there are a large number of small transactions focusing on several "hot" relations. Such a large number of small transactions on a "hot" relation R can cause both the rescheduler and other resource managers (like the lock manager) in charge of relation R to become a bottleneck. To address this second issue, the small transactions on relation R are further grouped into middle-sized transactions. In this way, the number of transactions on relation R is reduced.

Instructions of the various software routines or modules discussed herein (such as the scheduler 20, rescheduler 21, and so forth) are executed on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of scheduling transactions performed by one or more processors in a database system, comprising:
   receiving transactions in a queue;
   determining whether any of the transactions in the queue is able to perform a synchronized scan of a table with a first transaction that is executing;
   in response to determining that at least one of the transactions in the queue is able to perform the synchronized scan with the first transaction, rescheduling the transactions in the queue to enable execution of the at least one transaction ahead of other transactions in the queue;
   performing the synchronized scan in which the first transaction and the at least one transaction are synchronized in scanning the table during execution of the first transaction and the at least one transaction;
   providing results of execution of the first transaction and the at least one transaction to a client; and
   providing a buffer storage to store data associated with active transactions, wherein the first transaction and the at least one transaction when executing share a segment of the buffer storage.

2. The method of claim 1, further comprising moving the at least one transaction out of the queue to execute the at least one transaction.

3. The method of claim 1, further comprising storing data received from the table by the synchronized scan in the segment of the buffer storage.

4. The method of claim 3, wherein storing data received from the table comprises receiving rows of the table.

5. The method of claim 1, further comprising rescheduling transactions in the queue based on lock requirements of the transactions.

6. The method of claim 1, further comprising determining whether a second transaction in the queue has been in the queue for longer than a predetermined time period, and if so, determining whether the at least one transaction conflicts with the second transaction.

7. The method of claim 6, further comprising preventing execution of the at least one transaction if the at least one transaction conflicts with the second transaction.

8. The method of claim 1, wherein the transactions in the queue are associated with a first order of execution, and wherein rescheduling the transactions comprises changing the order of execution of the transactions in the queue to another order different from the first order.

9. The method of claim 1, wherein in performing the synchronized scan of the table, if the first transaction has already processed a number of pages of the table, then the at least one transaction when executed starts scanning the table from a page after the number of pages in synchronization with the first transaction.

10. A method of scheduling transactions in a database system, comprising:
    receiving transactions in a queue, wherein the queue has a length; determining whether any of the transactions in the queue is able to perform a synchronized scan of a table with a first transaction that is executing;
    in response to determining that at least one of the transactions in the queue is able to perform the synchronized scan with the first transaction, rescheduling the transactions in the queue to enable execution of the at least one transaction ahead of other transactions in the queue; and
    defining a window having a size less than the length of the queue,
    wherein the determining is performed on transactions in the window.

11. The method of claim 10, wherein the determining is performed plural times, the method further comprising moving the window along the queue with each determining so that a different set of transaction is examined each time.

12. An article comprising at least one storage medium containing instructions that when executed cause one or more processors in a database system to:
- receive transactions in a queue;
- determine whether any of the transactions in the queue is able to perform a synchronized scan of a table with a first transaction that is executing;
- in response to determining that at least one of the transactions in the queue is able to perform the synchronized scan with the first transaction, reschedule the transactions in the queue to enable execution of the at least one transaction ahead of other transactions in the queue;
- perform the synchronized scan in which the first transaction and the at least one transaction are synchronized in scanning the table during execution of the first transaction and the at least one transaction;
- provide results of execution of the first transaction and the at least one transaction to a client; and
- provide a buffer storage, wherein the first transaction and the at least one transaction when executing share a segment of the buffer storage.

13. The article of claim 12, wherein the instructions when executed cause the one or more processors in the database system to store rows received from the table by the synchronized scan in the segment of the buffer storage.

14. The article of claim 12, wherein the instructions when executed cause the one or more processors in the database system to further reschedule transactions in the queue based on lock requirements of the transactions.

15. The article of claim 12, wherein the instructions when executed cause the one or more processors in the database system to determine whether a second transaction in the queue has been in the queue for longer than a predetermined time period, and if so, determine whether the at least one transaction conflicts with the second transaction.

16. The article of claim 12, wherein the instructions when executed cause the one or more processors in the database system to prevent execution of the at least one transaction if the at least one transaction conflicts with the second transaction.

17. The article of claim 12, wherein the transactions in the queue are associated with a first order of execution, and wherein rescheduling the transactions comprises changing the order of execution of the transactions in the queue to another order different from the first order.

18. The article of claim 12, wherein in performing the synchronized scan of the table, if the first transaction has already processed a number of pages of the table, then the at least one transaction when executed starts scanning the table from a page after the number of pages in synchronization with the first transaction.

19. An article comprising at least one storage medium containing instructions that when executed cause a database system to:
- receive transactions in a queue, wherein the queue has a length;
- determine whether any of the transactions in the queue is able to perform a synchronized scan of a table with a first transaction that is executing; in response to determining that at least one of the transactions in the queue is able to perform the synchronized scan with the first transaction, reschedule the transactions in the queue to enable execution of the at least one transaction ahead of other transactions in the queue; and
- define a window having a size less than the length of the queue, wherein the determining is performed on transactions in the window.

20. The article of claim 19, wherein the determining is performed plural times, wherein the instructions when executed cause the database system to move the window along the queue with each determining so that a different set of transaction is examined each time.

21. A database system comprising:
- a storage containing a queue to store transactions waiting for execution; and
- one or more processors to:
  - reschedule the transactions in the queue based on whether any of the transactions in the queue is able to perform a synchronized scan of a table with an executing first transaction;
  - in response to determining that at least a second transaction is able to perform the synchronized scan of the table with the first transaction, execute the second transaction according to the rescheduling;
  - perform the synchronized scan in which the first transaction and the second transaction are synchronized in scanning the table during execution of the first and second transactions; and
  - provide results of execution of the first and second transactions to a client,
  - wherein the storage further comprises a buffer storage, the first and second transactions performing the synchronized scan of the table sharing a same segment of the buffer storage.

22. The database system of claim 21, the segment of the buffer storage to store rows of the table retrieved by the synchronized scan.

23. The database system of claim 22, wherein the first and second transactions performing the synchronized scan are table scan transactions.

24. The database system of claim 21, further comprising plural data server modules to access, in parallel, data contained in the storage during execution of the transactions.

25. The database system of claim 21, wherein the transactions in the queue are associated with a first order of execution, and wherein the one or more processors reschedule the transactions by changing the order of execution of the transactions in the queue to another order different from the first order.

26. The database system of claim 21, wherein in performing the synchronized scan of the table, if the first transaction has already processed a number of pages of the table, then the second transaction when executed starts scanning the table from a page after the number of pages in synchronization with the first transaction.

* * * * *

UNITED STATES PATENT AND TRADEMARK OFFICE
CERTIFICATE OF CORRECTION

| | | |
|---|---|---|
| PATENT NO. | : 7,418,706 B1 | Page 1 of 1 |
| APPLICATION NO. | : 10/431751 | |
| DATED | : August 26, 2008 | |
| INVENTOR(S) | : Gang Luo et al. | |

It is certified that error appears in the above-identified patent and that said Letters Patent is hereby corrected as shown below:

Title Page, Item (73) Assignee: Reads "Teradota US, Inc."
should read -- Teradata US, Inc. --

Signed and Sealed this
Nineteenth Day of February, 2013

Teresa Stanek Rea
*Acting Director of the United States Patent and Trademark Office*